March 8, 1966    I. A. GREENWOOD, JR    3,239,752
AUTOMATIC PHASE SHIFT CORRECTING CIRCUIT FOR FEEDBACK
MAGNETIC RESONANCE DEVICE

INVENTOR.
IVAN A GREENWOOD, JR.
ATTORNEY

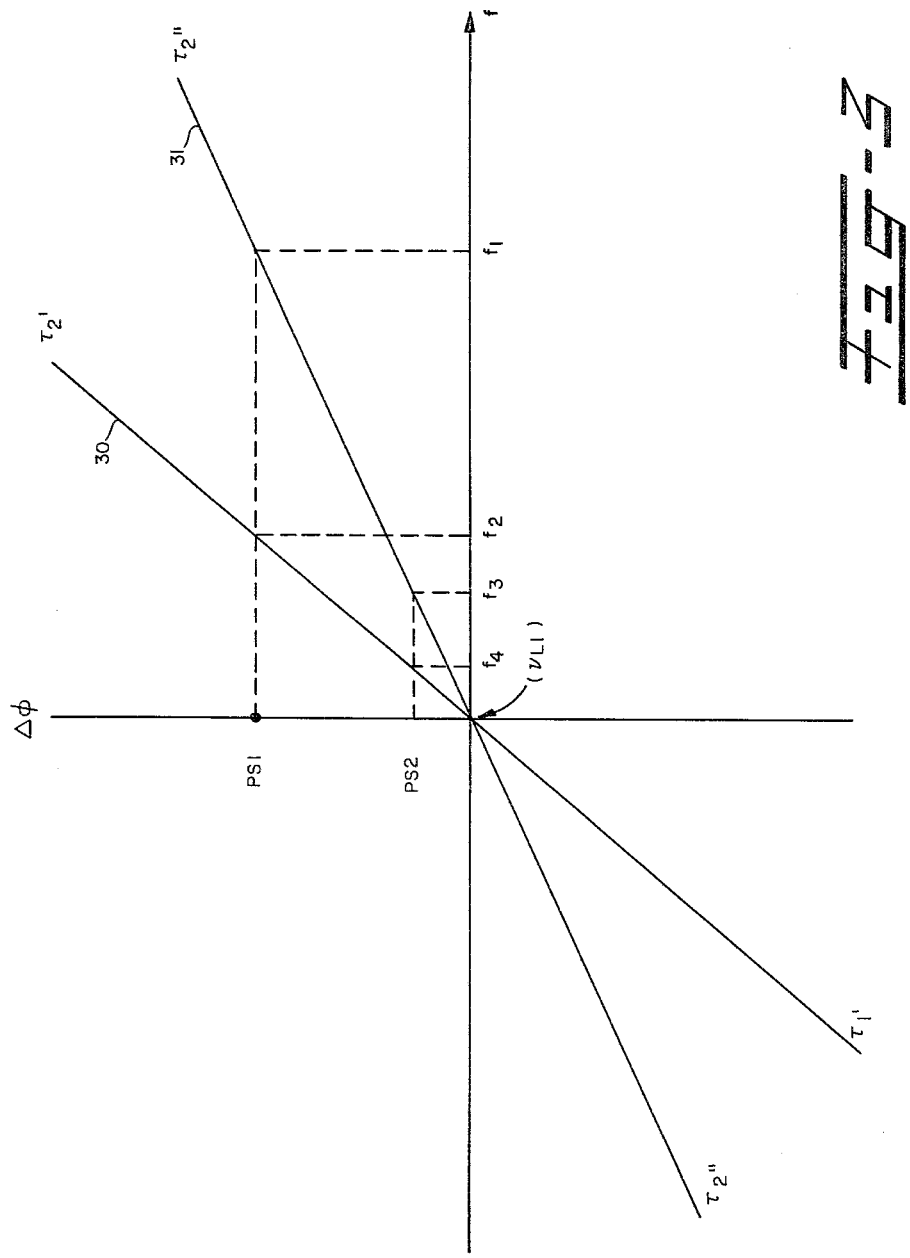

United States Patent Office 3,239,752
Patented Mar. 8, 1966

3,239,752
AUTOMATIC PHASE SHIFT CORRECTING CIRCUIT FOR FEEDBACK MAGNETIC RESONANCE DEVICE
Ivan A. Greenwood, Jr., Stamford, Conn., assignor to General Precision, Inc., a corporation of Delaware
Filed Nov. 27, 1963, Ser. No. 326,430
4 Claims. (Cl. 324—.5)

This invention relates to phase correcting circuits and more particularly to automatic phase correcting circuits for use with feedback magnetic resonance devices.

Magnetic resonance devices of the feedback type are utilized in a wide variety of applications such as magnetometers, storage devices and gyroscopes. Each of the above utilizations take advantage of one or more of the physical and electrical manifestations common to all feedback magnetic resonance devices to achieve its particular task. However, in each instance phase shifts within the device and the external utilization and implementation circuits may, if excessive, introduce sufficient error to impair the usefulness of the results or readings obtained.

Phase shifts within the feedback magnetic resonance device and the external utilization or implementation circuits may be determined by measurement and corrected during fabrication. But if the device is to be operated under severe operating conditions, insofar as temperature, humidity and other environmental conditions are concerned the phase shift characteristics will require continuous adjustment. In addition, normal aging of the components in the external utilization and implementation circuits as well as changes within the resonance device will each introduce additional phase shift which will vary with time.

It is therefore the object of this invention to provide a circuit for automatically adjusting the phase shift in feedback magnetic resonance devices to automatically compensate for external and internal changes in the phase shift.

The invention contemplates a circuit for automatically compensating for changes in the phase shift of a feedback magnetic resonance device comprising, means for modulating the transverse relaxation time constant of the precessing articles within the magnetic resonance device whereby the observed Larmor frequency of the device is frequency modulated at the frequency of the modulating means whenever phase shift is present in the signal path, means responsive to the output of the magnetic resonance device for demodulating the output to secure a signal at the modulating frequency, means for phase comparing the demodulated output and the modulating signal and for supplying an error signal corresponding to the magnitude and relative sense of the demodulated signal with respect to the modulating signal, and means in the signal path of the magnetic resonance device responsive to the said error signal for altering the total phase shift in the signal path in accordance with the said error signal whereby the error signal is reduced towards zero when the total phase shift in the signal path is reduced towards zero.

The foregoing and other objects and advantages of the invention will become more apparent from a consideration of the drawings and specification wherein several embodiments of the invention are shown and described in detail for illustration purposes only.

In the drawings:

FIGURE 3 is a graph for explaining the operation of the circuits shown in FIGURES 1 and 2.

Figure 1:
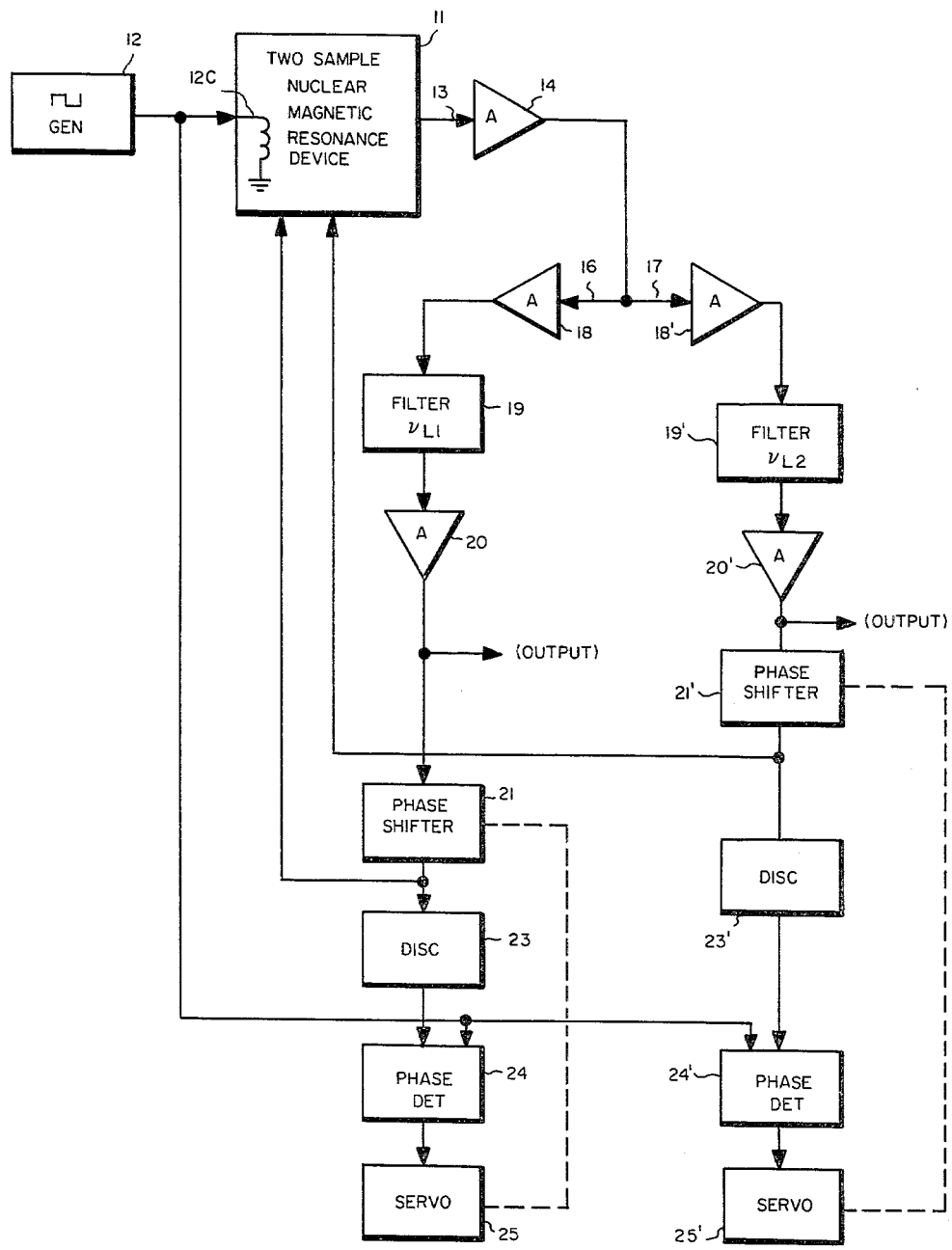
FIGURE 1 is a schematic diagram of one embodiment of a novel automatic phase shift correcting circuit constructed in accordance with the invention.

In FIGURE 1 a feedback magnetic resonance device 11, which may be similar to those disclosed in Patent No. 3,103,621 or Patent No. 3,103,623, is connected to a square wave generator 12 which energizes a coil 12C to modulate the transverse relaxation time constant in the magnetic resonance device 11 at the frequency of generator 12. This results in a frequency modulation at the frequency of generator 12 of the Larmor frequency output of device 11. The output of magnetic resonance device 11 is sometimes referred to as the apparent Larmor frequency since it may deviate from the theoretical Larmor frequency because of operating conditions.

The transverse relaxation time constant is modulated by introducing variable inhomogeneity in the static or nonvarying magnetic field associated with the device or magnetic resonance cell 11. The variation is preferably cyclical however, any type of variation may be employed.

While only modulation of the inhomogeneity of the static field is shown, modulation of the transverse relaxation time constant, the phenomena sometimes referred to as modulating the line width, may be achieved in a number of other ways. This may be illustrated by the following equation.

(1) $$1/\tau_2 = \frac{1}{T_{2*}} = +\frac{1}{T_P} = +\frac{1}{T_{2*}} =$$

Where $\tau_2$ is the transverse relaxation time constant
$T_2$ is the intrinsic time constant
$T_P$ is the pumping relaxation time constant, and
$T_2^*$ is the transverse inhomogeneity relaxation time constant.

From the above equation it is obvious that modulation of $\tau_2$ is possible by modulating $T_2$, $T_P$ and $T_2^*$ individually or incombination.

The transverse relaxation time constant may be modulated by modulating the intrinsic transverse relaxation time constant $T_2$. This may be accomplished by modulating the temperature of cell 11. However, this arrangement is quite cumbersome and not as well controlled as modulation of the transverse inhomogeneity relaxation time constant $T_2^*$ previously described.

In the case of optically pumped magnetic resonance devices the transverse relaxation time constant $\tau_2$ may be modulated by modulating the pumping relaxation time constant $T_P$. Here $T_P$ may be modulated by modulating the pumping beam intensity.

Magnetic resonance cell 11 provides an output on a conductor 13 containing the Larmor frequencies of the two samples within the cell 11. These are amplified in a preamplifier 14 and applied to two similar channels 16 and 17.

Each channel includes a buffer amplifier 18 and a filter 19 connected in series to the output of amplifier 14. The filter in channel 16 passes the Larmor frequency supplied by the first sample in cell 11 while the filter in channel 17 passes the Larmor frequency supplied by the second sample in cell 11.

The filter outputs are amplified by an amplifier 20 and passed through variable phase shift networks 21 where they are fed back to the cell 11 to maintain precession of the nuclear particles associated with the different samples in the cell. This process is fully described in Patents Nos. 3,103,621 and 3,103,623 referred to above.

Each of the channels includes in addition a frequency discriminator 23 connected to the output of circuit 21 for separating the modulating frequency from the carrier and a phase detector 24 for phase comparing the output of generator 12 with the demodulated output from discriminator 23. Phase detector 24 provides an error signal which is indicative of the magnitude and relative sense of the demodulated signal with respect to the output of generator 12. The error signal thus derived is fed through a servomechanism 25 to phase shifting circuit 21 to correct the phase shift in the signal feedback loop.

The operation of the circuit described above is best understood by referring to the graph illustrated in FIGURE 3 in which two curves 30 and 31 are shown. Each is a plot of the output frequency $\gamma_{L_1}$ of cell 11 vs. the total amount of phase shift within the cell 11 and the feedback loop comprising amplifiers 14, 16 and 20, filter 19 and phase shift circuit 21 for different values of $\tau_2$, the transverse relaxation time constant.

Both curves pass through the frequency $\gamma_{L_1}$ for the zero phase shift condition and diverge in opposite directions on opposite sides of the zero phase shift condition. Three error conditions are shown in the figure. If the total phase shift is PS1, the output frequency of the cell 11 switches from $f_1$ to $f_2$ at the rate of generator 12. This produces an error signal via channel 16 which is applied to phase shifting circuit 21 to alter the phase shift in the signal loop.

When the total phase shift as a result of the action of servo system 25 is reduced to PS2 the frequency output of cell 11 switches from $f_3$ to $f_4$ at the rate of generator 12. The error signal supplied by channel 16 and servo 25 further reduces the phase shift error by adjusting circuit 21.

At the zero error condition, that is the point where curves 30 and 31 intersect, no frequency modulation of the signal from cell 11 occurs. Therefore, no error signal is supplied to circuit 21 and the circuit continues to operate in this condition until such time as the phase shift within cell 11 or the feedback loop as previously described changes due to aging or some other change in either internal or external conditions.

FIGURE 3 illustrates the principle of operation with respect to one sample only. However, modulating $\tau_2$ will produce the same effect on the Larmor frequency $\gamma_{L_2}$ of the second sample in cell 11. Channel 17 is utilized for processing this signal. Since each of the Larmor signals has a different loop, each loop can be individually corrected for the phase shift associated with that frequency.

It is not possible to adjust a single common circuit element such as amplifier 14 in the common portion of the two signal loops since the signals are at widely separated frequencies and correction for one frequency would introduce a phase shift error with respect to the other frequency.

The operation of the circuit may also be analyzed from another point of view which may prove helpful in obtaining a better understanding of its operation. The following set of equations set forth mathematically circuit operation without angular rotation.

(2) $$\gamma_{LS1} = \alpha_1 H_0 + \frac{\Delta\phi_{C-1}}{\tau_{2-1}} + \frac{\Delta\phi_{E-1}}{\tau_{2-1}}$$

and (3) $$\gamma_{LS2} = \alpha_2 H_0 - \frac{\Delta\phi_{C-2}}{\tau_{2-2}} + \frac{\Delta\phi_{E-2}}{\tau_{2-2}}$$

where $\gamma_{LSj}$ = the Larmor frequency of sample $j$,
$\alpha_j$ = Larmor frequency constant of sample $j$,
$H_0$ = the static magnetic field,
$\Delta\phi_{C-j}$ = the internal phase shift within cell 11 for sample $j$,
$\Delta\phi_{E-j}$ = the external phase shift in the feedback loop for sample $j$,
$\tau_{2-j}$ = the transverse relaxation time constant for sample $j$, and
$j = 1$ for sample 1, 2 for sample 2.

Dividing Equation 2 by 3

(4) $$\frac{\gamma LS1}{\gamma LS2} = \frac{\alpha 1}{\alpha 2}\left[1 + \Delta\phi_{C-1}\left(\frac{1}{\alpha_1 H_0 \tau_{2-1}} + \frac{1}{\alpha_2 H_0 \tau_{2-2}}\right) + \frac{\Delta\phi_{E-1}}{\alpha_1 H_0 \tau_{2-1}} - \frac{\Delta\phi_{E-2}}{\alpha_2 H_0 \tau_{2-2}}\right]$$

and rearranging (5) $$\frac{\gamma LS1}{\gamma LS2} = \frac{\alpha 1}{\alpha 2}\left[1 + \frac{1}{\alpha_1 H_0 \tau_{2-1}}(\Delta\phi_{C-1} + \Delta\phi_{E-1}) + \frac{1}{\alpha_2 H_0 \tau_{2-2}}(\Delta\phi_{C-2} - \Delta\phi_{E-2})\right]$$

From Equation 5 it is obvious that the ratio of $\tau_{LS1}/\tau_{LS2}$ if maintained constant when the transverse relaxation time is varied would indicate a zero phase shift condition in the entire signal paths since any phase shift introduced in either a common or uncommon element in the signal paths will upset the ratio. This is so because of the difference between the Larmor frequencies of the two samples in cell 11.

The quantities $(\Delta\phi_{C-1} + \Delta\phi_{E-1})$ and $(\Delta\phi_{C-2} - \Delta\phi_{E-2})$ from Equation 5 is set to zero will provide the constant ratio referred to above. Each bracketed quantity may be made zero by properly setting circuit 21 which in one channel controls $\Delta\phi_{E-1}$ and in the other $\Delta\phi_{E-2}$. Servos 25 drive the individual circuits or channels to zero by adjusting circuits 21 to null the outputs of phase detectors 24. It is possible to null these since at zero phase shift no modulation of the output frequencies $\gamma_{LS1}$ or $\gamma_{LS2}$ occurs, see FIGURE 3 and the description thereof above.

Figure 2:
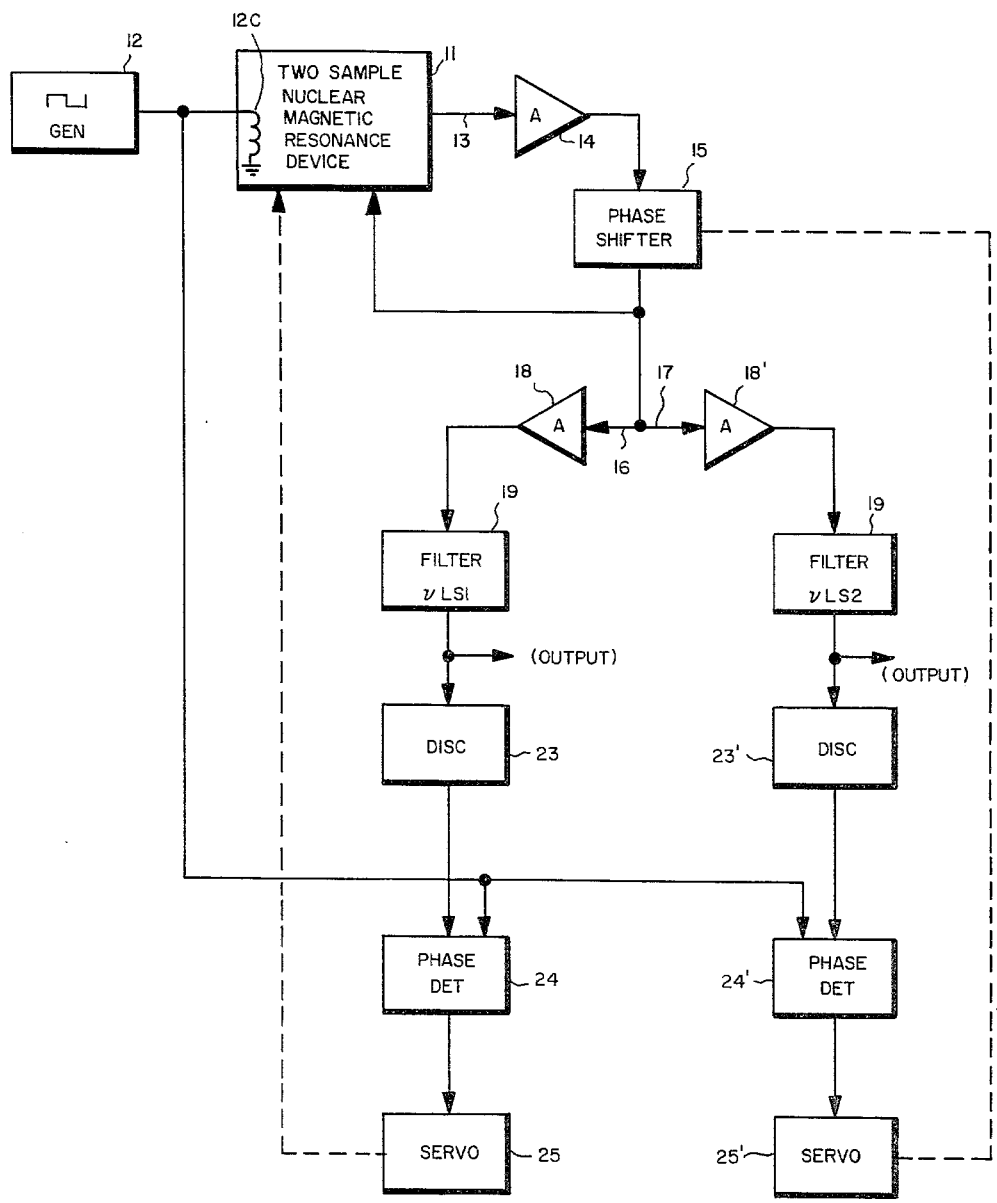
FIGURE 2 is a schematic diagram of a second embodiment of the invention.

In certain instances it is desirable to employ a single signal feedback loop for maintaining forced precessing of the two samples in cell 11. This arrangement is illustrated in FIGURE 2 wherein circuits similar to those in FIGURE 1 bear the same reference numerals. Channels 16 and 17 are identical to those in FIGURE 1 except for the omission of amplifiers 20 and circuits 21. A single phase shift circuit 15 is inserted in the feedback loop after amplifier 14 and the output of circuit 15 is applied to the RF coil in cell 11.

With this arrangement $\gamma_{LS1}$ and $\gamma_{LS2}$ are amplified by amplifier 14 passed through circuit 15 and returned simultaneously to one RF coil. Servos 25 provide outputs identical in every respect to those supplied by servos 25 of FIGURE 1. However, the output of servo 25 of channel 17 is utilized to control delay circuit 15 while that of channel 16 is utilized to control the position of the RF coil in cell 11.

Referring again to Equation 5, terms $(\Delta\phi_{C-1} + \Delta\phi_{E-1})$ and $(\Delta\phi_{C-2} - \Delta\phi_{E-2})$ will both be set to zero by the circuit disclosed in FIGURE 2. Servo 25 of channel 17 adjusts the phase shift circuit in the common loop to correct the phase shift present for sample 2 by selecting the correct value for $\Delta\phi_{E-2}$ to reduce the quantity $$(\Delta\phi_{C-2} - \Delta\phi_{E-2})$$

to zero while servo 25 of channel 16 adjusts the position of the RF coil in cell 11 to correct the phase shift present for sample 1 by selecting the correct value for $\Delta\phi_{C-1}$ to reduce the quantity $(\Delta\phi_{C-1} + \Delta\phi_{E-1})$ to zero. Both adjustments affect the phase shift of the Larmor frequency of both samples, however, they may be made to converge in response to the outputs of servos 25 to provide zero phase shift for both Larmor frequencies.

While several embodiments of the invention have been illustrated and described in detail, it is to be expressly understood that the invention is not limited thereto. Various changes and modifications may also be made in the design and arrangement of the parts without departing from the spirit and scope of the invention as the same will now be understood by those skilled in the art.

What is claimed is:
1. A circuit for automatically compensating for changes in the phase shift in the feedback signal path of a two sample feedback magnetic resonance device employing different feedback loops for each of the Larmor frequencies supplied by the two samples comprising,
  means providing an output for varying the transverse relaxation time constant of the precessing nuclear particles of both samples within the magnetic resonance device to cause a modulation of the Larmor frequency output associated with each of said samples whenever phase shift at the particular Larmor frequency is present in the feedback signal paths of the device,
  each of said feedback loops including, filter means for restricting the loop to one of the modulated Larmor frequencies only and adjustable delay means for controlling the total delay in the feedback loop,
  a first demodulator responsive to the filtered modulated Larmor frequency in one feedback loop for demodulating one Larmor frequency and passing the modulating signal,
  a first phase comparator responsive to the output of the first demodulator and the said varying output for providing a first error signal corresponding to the relative magnitude and sense of the two signals,
  first control means responsive to the first error signal for adjusting the delay means in the said one feedback loop in accordance with the said first error signal whereby the first error signal is reduced to zero when the total phase shift in the said one feedback loop is reduced to zero,
  a second demodulator responsive to the filtered modulated Larmor frequency in the said other feedback loop for demodulating the other Larmor frequency and passing the modulating signal,
  a second phase comparator responsive to the output of the second demodulator and the said varying output for providing a second error signal corresponding to the relative magnitude and sense of the signals, and
  second control means responsive to the second error signal for adjusting the delay means in the said other feedback loop in accordance therewith whereby the second error signal is reduced to zero when the total phase shift in the said other feedback loop is reduced to zero.

2. A compensating circuit as set forth in claim 1 in which the means for varying the transverse relaxation time constant of the nuclear particles of both samples includes,
  auxiliary windings in close proximity to the direct current field of the nuclear magnetic resonance device and arranged to establish an overlapping field when energized, and
  a square wave generator for cyclically energizing said auxiliary windings whereby the inhomogeneity of the direct current field is cyclically switched from a first to a second value at the cyclic rate of the said square wave generator.

3. A circuit for automatically compensating for changes in the phase shift in the feedback signal path of a two sample feedback magnetic resonance device employing feedback means for the different Larmor frequencies supplied by the two samples comprising,
  means providing a periodic output for cyclically varying the transverse relaxation time constant of the precessing nuclear particles of both samples within the magnetic resonance device to cause a modulation of the Larmor frequency output associated with each of said samples whenever phase shift at the particular Larmor frequency is present in the said feedback means,
  said feedback path including first and second adjustable delay means,
  means responsive to the feedback signals for separating the two modulated Larmor frequencies,
  a first demodulator responsive to one of the separated Larmor frequencies for demodulating said one Larmor frequency and passing the modulating signal,
  a first phase comparator responsive to the output of the first demodulator and the said periodic output for providing a first error signal corresponding to the relative magnitude and sense of the two signals,
  first control means responsive to the first error signal for adjusting the first delay means in accordance with the first error signal whereby the first error signal is reduced to zero when the total phase shift in the feedback means at the said one Larmor frequency is reduced to zero,
  a second demodulator responsive to the said other separated Larmor frequency for demodulating said other Larmor frequency and passing the modulating signal,
  a second phase comparator responsive to the output of the first demodulator and the said periodic output for providing a second error signal corresponding to the relative magnitude and sense of the two signals, and
  second control means responsive to the second error signal for adjusting the second delay means in accordance with the second error signal whereby the second error signal is reduced to zero when the total phase shift in the feedback means at the said other Larmor frequency is reduced to zero.

4. A compensating circuit as set forth in claim 3 in which the means for cyclically varying the transverse relaxation time constant of the nuclear particles of both samples includes,
  auxiliary windings in close proximity to the direct current field of the nuclear magnetic resonance device and arranged to establish an overlapping field when energized, and
  a square wave generator for cyclically energizing said auxiliary windings whereby the inhomogeneity of the direct current field is cyclically switched from a first to a second value at the cyclic rate of the said square wave generator.

References Cited by the Examiner

UNITED STATES PATENTS

| | | | |
|---|---|---|---|
| 2,916,690 | 12/1959 | Leete | 324—.5 |
| 2,922,947 | 1/1960 | Bloom et al. | 324—.5 |

CHESTER L. JUSTUS, *Primary Examiner.*

MAYNARD R. WILBUR, *Examiner.*